US008182239B2

(12) United States Patent
Higashidozono et al.

(10) Patent No.: US 8,182,239 B2
(45) Date of Patent: May 22, 2012

(54) CONTROL VALVE, AND CONTROL VALVE FOR VARIABLE DISPLACEMENT COMPRESSOR USING THE CONTROL VALVE

(75) Inventors: Hideki Higashidozono, Tokyo (JP); Norio Uemura, Tokyo (JP); Kohei Fukudome, Tokyo (JP)

(73) Assignee: Eagle Industry Co., Ltd. (JP)

( * ) Notice: Subject to any disclaimer, the term of this patent is extended or adjusted under 35 U.S.C. 154(b) by 770 days.

(21) Appl. No.: 12/278,067

(22) PCT Filed: Jan. 31, 2007

(86) PCT No.: PCT/JP2007/051570
§ 371 (c)(1),
(2), (4) Date: Aug. 1, 2008

(87) PCT Pub. No.: WO2007/111039
PCT Pub. Date: Oct. 4, 2007

(65) Prior Publication Data
US 2009/0179164 A1    Jul. 16, 2009

(30) Foreign Application Priority Data

Mar. 29, 2006  (JP) .................................. 2006-090602

(51) Int. Cl.
*F04B 1/26* (2006.01)
*F04B 27/08* (2006.01)
*F04B 1/12* (2006.01)

(52) U.S. Cl. ...................... 417/222.2; 417/269; 417/270

(58) Field of Classification Search ............... 417/222.2, 417/270, 269
See application file for complete search history.

(56) References Cited

U.S. PATENT DOCUMENTS

| 4,186,653 | A | * | 2/1980 | Hobbs | .................. 92/34 |
| 6,062,824 | A | * | 5/2000 | Kimura et al. | .............. 417/222.2 |
| 6,626,645 | B2 | | 9/2003 | Okii et al. | |
| 6,772,990 | B2 | | 8/2004 | Sasaki et al. | ............. 251/129.03 |
| 7,165,534 | B2 | | 1/2007 | Usui et al. | ..................... 123/467 |

FOREIGN PATENT DOCUMENTS

EP    1-342 911    9/2003

(Continued)

OTHER PUBLICATIONS

Extended European Search Report, Appln. No. 07707772.5-2315/2000720, dated Jun. 15, 2011, 6 pages.

(Continued)

*Primary Examiner* — Peter J Bertheaud
(74) *Attorney, Agent, or Firm* — Hayes Soloway P.C.

(57) ABSTRACT

A control valve includes a diaphragm assembly imparting a biasing force to a moving member according to the pressure introduced into the pressure-sensitive part. The moving member is moved by the biasing force to control the valve opening. The control valve further includes a solenoid part which imparts the thrust of the diaphragm assembly produced according to the pressure introduced into the pressure-sensitive part to the moving member through a diaphragm holding body as a biasing force, and imparts a biasing force capable of controlling the valve opening in cooperation with the aforesaid biasing force to the moving member.

2 Claims, 3 Drawing Sheets

FOREIGN PATENT DOCUMENTS

| | | |
|---|---|---|
| JP | 37-8658 | 7/1962 |
| JP | 62-105464 | 7/1987 |
| JP | 2000-88125 | 3/2000 |
| JP | 2000-88129 | 3/2000 |
| JP | 2001-141086 | 5/2001 |
| JP | 2003-254191 | 9/2003 |
| JP | 2003-322086 | 11/2003 |

OTHER PUBLICATIONS

Chinese Office Action, Appln. 2007800020338, dated Jan. 15, 2010, 2 pages.

Japanese Official Action dated Sep. 6, 2011 and translation (4 pgs).

US Official Action in related U.S. Appl. No. 12/278,101, dated Oct. 12, 2011.

\* cited by examiner

Fig.6 - PRIOR ART

CONTROL VALVE, AND CONTROL VALVE FOR VARIABLE DISPLACEMENT COMPRESSOR USING THE CONTROL VALVE

TECHNICAL FIELD

The present invention relates to a control valve provided with a pressure sensitive part, a solenoid part, and a valve portion composed of a valve element provided to a moving member and in which the valve opening of the valve element is adjusted by a movement of the moving member that is based on a biasing force imparted to the moving member; and relates to a control valve for a variable displacement compressor in which the control valve is used to adjust the discharge capacity of the variable displacement compressor.

BACKGROUND ART

An example of a known control valve (see Patent Document 1) for a variable displacement compressor that is used for compressing refrigerant in an air conditioner of an automotive vehicle is a control valve having a pressure sensitive part that imparts a biasing force to a moving member in accordance with the pressure introduced to the pressure sensitive part, and moves the moving member by the biasing force to adjust the valve opening. The control valve uses a bellows assembly in the pressure sensitive part, and FIG. 6 is a schematic cross-sectional view of such a control valve for a variable displacement compressor.

The control valve 1 is composed of a solenoid part 2, a valve portion 3, and a bellows assembly 4, as shown in FIG. 6. The solenoid part 2 is disposed at one end of a cylindrical valve body 5, generates a magnetic force by supplying an electric current to a coil 6, moves the movable iron core 7 to the fixed iron core 9 side disposed in the leftward direction against a spring 8, and imparts a biasing force having a magnitude proportional to the square of the direct current value to a valve rod 10. A port 11 that is in communication with a discharge pressure Pd area of the variable displacement compressor, and a port 12 that is in communication with an inner chamber (chamber pressure Pc) of the variable displacement compressor are formed on the valve body 5, and a valve portion 3 is configured so that the flow rate of the discharge refrigerant gas that flows toward the inner chamber of the compressor can be adjusted based on the valve opening in relation to the valve seat 14 of the valve element 13 formed at the end portion of a valve rod 10.

In contrast, a bellows assembly 4 is disposed in a pressure sensitive chamber 16, which is composed of a case 15 and the valve body 5, at the other end portion on the opposite side of the solenoid part 2 of the valve body 5 constituting the pressure sensitive part 16, and a suctioning pressure Ps of the compressor acts on the pressure sensitive chamber 16. The bellows assembly 4 has a bellows 19 in which both sides are retractably held by holders 17, 18. A spring 20 is mounted between the two holders, and a connecting rod 21 is disposed between the holder 18 and a left end 10a of the valve rod 10, connected in direct contact with the two members. Therefore, the bellows 19 expands and contracts in accordance with variations in the suctioning pressure Ps introduced to the pressure sensitive chamber 16, the biasing force acting on the valve rod 10 varies, and the valve opening becomes variable.

The balance formula Ps=(F1+F2−F)/A of the force that operates on the valve rod 10 applies when the control valve 1 configured in this manner is open, wherein F1 is a biasing force of the spring 20, F2 is the biasing force of the spring 8, F is a solenoid thrust, and A is an effective pressure receiving surface area of the bellows. It is apparent from the formula that the suctioning pressure Ps is balanced at a low value when the solenoid thrust F is increased, and conversely, the suctioning pressure Ps is balanced at a high value when the solenoid thrust F is reduced. Therefore, [the control valve 1] is widely used as a control valve for variable displacement compressors that are used for compressing refrigerant in air conditioners.
Patent Document 1: Japanese Laid-open Patent Application No. 2001-141086 (paragraphs 0015 to 0018, and FIGS. 1 and 4)

DISCLOSURE OF THE INVENTION

Problems to Be Solved by the Invention

However, the control valve 1 in Patent Document 1 is configured so that the suctioning pressure Ps operates on the bellows 19 disposed in the pressure sensitive chamber 16 and the effective pressure receiving surface area of the bellows 19 is limited to 0.2 $cm^2$ in terms of molding techniques. Therefore, it is apparent from the balance formula that the suctioning pressure Ps in relation to small variations in solenoid thrust cannot be balanced using a high value. For example, when applied to an air conditioner in which $CO_2$ having a high suctioning pressure is used as the refrigerant, a bellows must inevitably be used in which the effective pressure receiving surface area is large, and it is difficult to reduce the size of the apparatus.

The present invention was contrived in view of such problems, and an object thereof is to provide a small control valve in which the valve opening can be adjusted by the pressure introduced to the pressure sensitive part in accordance with small variations in the thrust produced by the solenoid.

In order to solve the above-described problems, a control valve according to a first aspect of the present invention comprises: a pressure sensitive part; a solenoid part; and a valve portion composed of a valve element provided to a moving member, wherein the valve opening of the valve element is adjusted by a movement of the moving member that is based on a biasing force imparted to the moving member; the control valve being characterized in that a diaphragm assembly is disposed in the pressure sensitive part; the diaphragm assembly is composed of at least one diaphragm unit having two diaphragms bonded together to form a sealed pressure chamber therebetween; and the center portion of the diaphragm unit is connected in direct contact with a diaphragm holding body, imparts as a first biasing force to the moving member via the diaphragm holding body a thrust of the diaphragm unit generated in accordance with the pressure introduced to the pressure sensitive part, and imparts to the moving member a solenoid thrust produced in accordance with an input signal from the solenoid part as a second biasing force that operates in coordination with the first biasing force.

In accordance with this aspect, the movement position of the moving member produced by the pressure introduced to the pressure sensitive part is determined and the position of the valve can be adjusted in accordance with the biasing force imparted to the moving member generated by the solenoid thrust. The diaphragm assembly can be composed of at least one diaphragm unit in which two diaphragms are bonded together to form a sealed pressure chamber inside the two diaphragms. Therefore, a diaphragm unit having a small pressure receiving surface area that cannot be produced with a bellows is used, whereby the diaphragm unit can be controlled with small variations of the solenoid thrust and the control valve can be made smaller, even when the thrust introduced to the pressure sensitive part is relatively large. The diaphragm assembly is composed of a plurality of serially disposed diaphragm units, whereby the required stroke distance can be adjusted. In addition, the thrust generated by the diaphragm unit against the pressure introduced to the pressure sensitive part can be adjusted by enclosing gas into a pressure chamber formed by bonding two diaphragms.

The control valve according to the second aspect of the present invention is the control valve according to the first aspect, wherein the diaphragm holding body is engagingly held by a spring member disposed at an external periphery of the holding unit.

In accordance with this aspect, since the diaphragm holding body engages and is held by a spring member disposed at the external periphery of the holding unit, the thrust produced in the diaphragm assembly due to the pressure introduced to the pressure sensitive part is transmitted to the moving member in a stable state because the tilt can be reduced by a spring member even when the diaphragm assembly receives a bias force so as to tilt during expansion and contraction.

The control valve for a variable displacement compressor according to the third aspect of the present invention is a control valve for a variable displacement compressor designed to vary a discharge capacity of the variable displacement compressor using the control valve according to the first or second aspect; the control valve for a variable displacement compressor being characterized in that the variable displacement compressor varies the discharge capacity using a pressure difference between an interior pressure of the compressor and a suctioning pressure; the suctioning pressure of the compressor is introduced to the pressure sensitive part of the control valve; the discharge pressure area of the compressor and the inner chamber of the compressor are in communication via a communication channel; and a flow rate in the communication channel is adjusted on the basis of a valve opening set by the moving member.

In accordance with this aspect, the pressure difference between the interior pressure of the compressor and the suctioning pressure is rapidly varied by the biasing force imparted to the moving member of the solenoid, and the discharge rate of the variable displacement compressor can be rapidly varied and can be applied to air conditioners in which a high suctioning pressure is used.

BRIEF DESCRIPTION OF THE DRAWINGS

FIG. 5(a) is a front view of the diaphragm unit constituting the diaphragm unit, FIG. 5(b) is a cross-sectional view along the line A-A of FIG. 5(a), and FIG. 5(c) is a lateral cross-sectional view of the diaphragm unit formed by joining two diaphragm units; and FIG. 6 is a schematic cross-sectional view of a conventional control valve for a variable displacement compressor.

KEY

Figure 1:
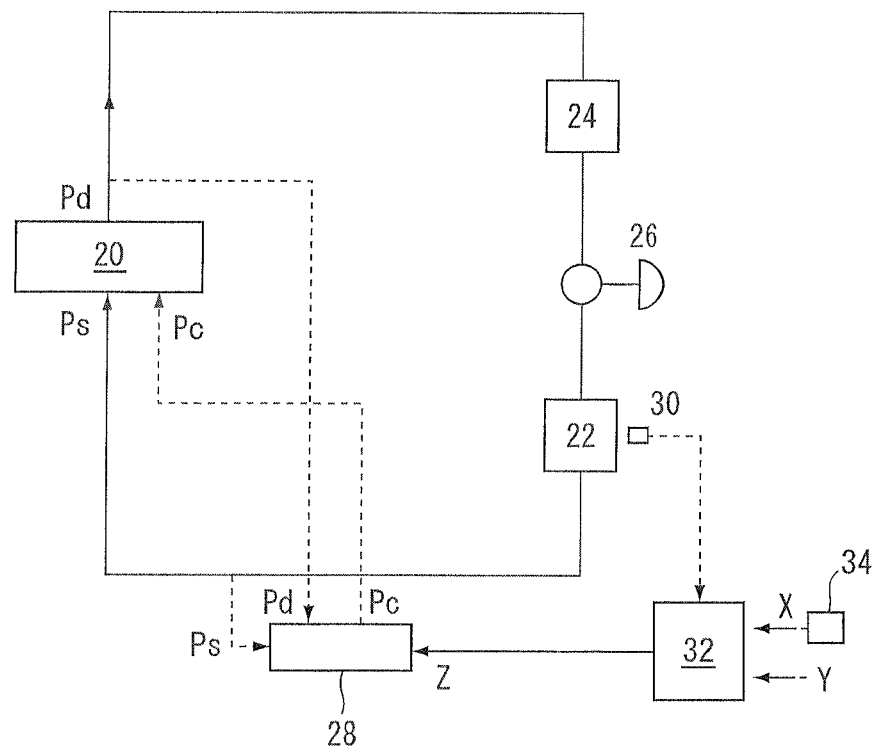
FIG. 1 is a control flow diagram of a cooling cycle of a variable displacement compressor in an example of the present invention.

20 Variable displacement compressor
22 Evaporator
24 Condenser
26 Expansion valve
28 Control valve
30 Temperature sensor
32 Controller
34 Temperature setting device
36 Solenoid part
38 Valve portion
40 Pressure sensitive part
42 Valve body
44 Coil
46 Movable iron core
48 Spring
49 Fixed iron core
50 Valve rod (moving member)
52, 54 Ports
56 Valve element
58 Valve seat
60 Casing
62 Pressure sensitive chamber
64 Diaphragm assembly
66 Diaphragm holding body
68 Diaphragm unit
69 Diaphragm unit
70 Spacer
72 Spring
74 Connecting rod
Ps Suctioning pressure
Pd Discharge pressure
Pc Chamber pressure of compressor

BEST MODE FOR CARRYING OUT THE INVENTION

Examples of the present invention will be described below.

Figure 2:
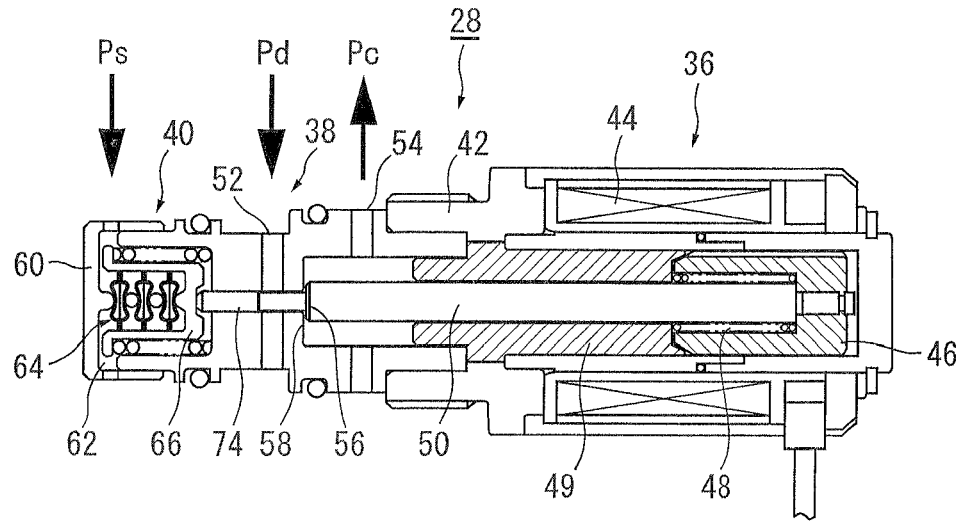
FIG. 2 is a cross-sectional view of the control valve used in FIG. 1.
Figure 3:
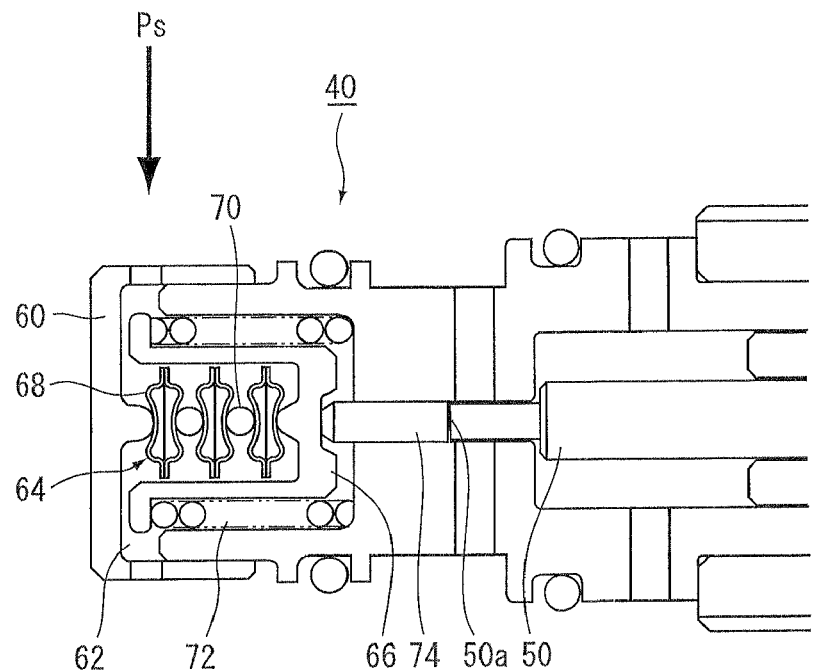
FIG. 3 is an enlarged cross-sectional view of the pressure sensitive chamber.
Figure 4:
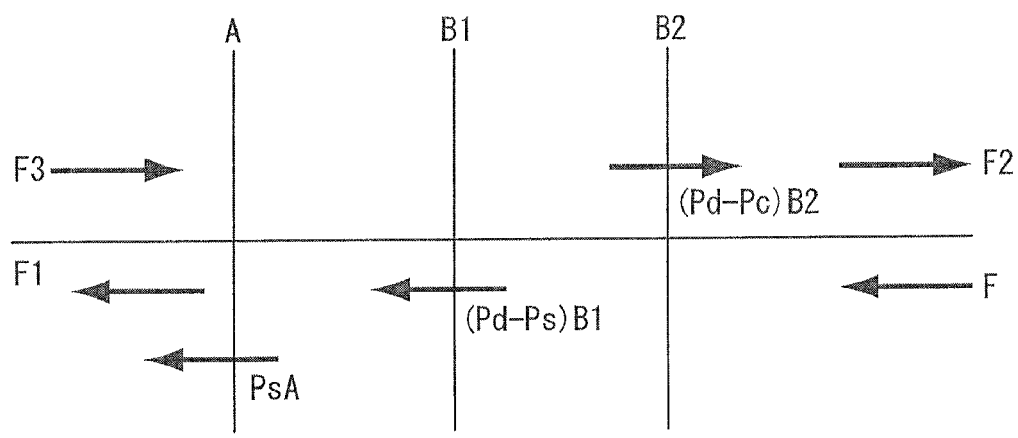
FIG. 4 is a schematic diagram of the state of balance of the biasing force applied to the valve rod.
Figure 5:
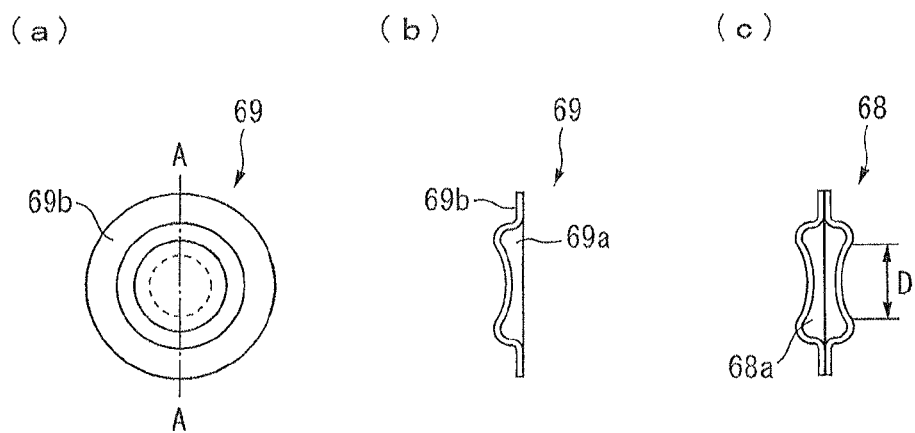
FIG. 5 shows the structure of a diaphragm unit.
Figure 5:
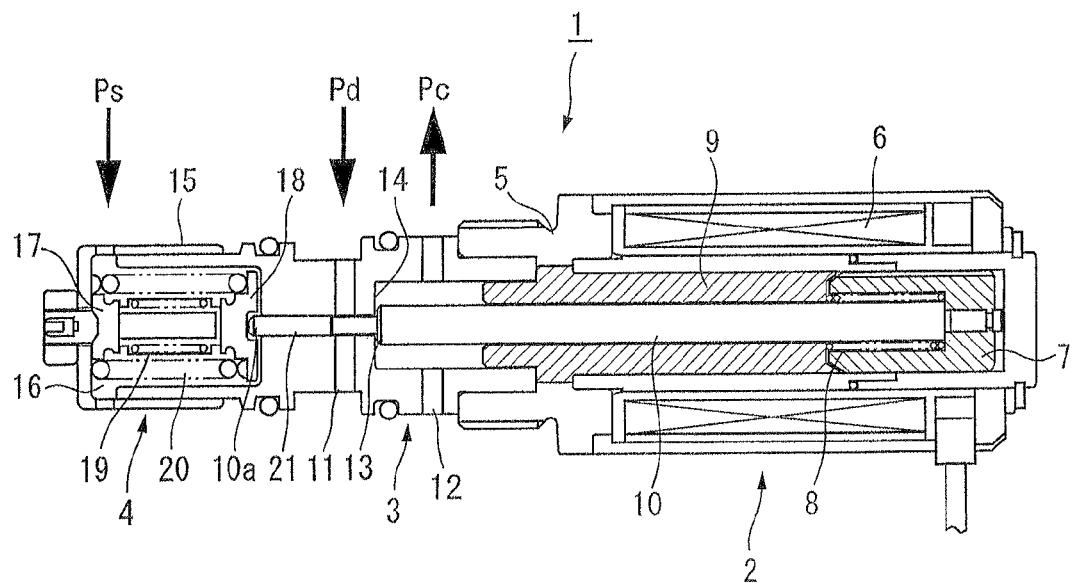

FIG. 1 is a control flow diagram of a cooling cycle of a variable displacement compressor in an example of the present invention; FIG. 2 is a cross-sectional view of the control valve used in FIG. 1; FIG. 3 is an enlarged cross-sectional view of the pressure sensitive chamber; FIG. 4 is a schematic diagram of the state of balance of the biasing force applied to the valve rod; FIG. 5 shows the structure of a diaphragm unit, FIG. 5(a) is a front view of the diaphragm unit constituting the diaphragm unit, FIG. 5(b) is a cross-sectional view along the line A-A of FIG. 5(a), and FIG. 5(c) is a lateral cross-sectional view of the diaphragm unit formed by joining two diaphragm units.

The control valve of the present invention is used for controlling output of a variable displacement compressor that is used for compressing refrigerant of a car air conditioner or other air conditioner for a vehicle, and a function in the cooling cycle of the control valve will be described with reference to FIG. 1. The cooling cycle shown in FIG. 1 is a widely known cycle in which a refrigerant gas having a suctioning pressure Ps suctioned from an evaporator 22 using a variable displacement compressor 20 is compressed to a high discharge pressure Pd, the compressed refrigerant gas is used as a liquid refrigerant in a condenser 24 and is thereafter gasified in a single operation using expansion valve 26 and brought to the evaporator 22, the passenger compartment is cooled by latent heat of vaporization, and the refrigerant gas is again suctioned into the variable displacement compressor 20. The cooling cycle is configured so that a control valve 28 controls the discharge capacity of the variable displacement compressor 20 in accordance with a cooling load.

A temperature sensor 30 is disposed in the vicinity of the evaporator 22, and the temperature information of the evaporator 22 is sent to a controller 32 as an input signal, as shown in FIG. 1. Also, setting information X obtained from a temperature setting device 34, which specifies the temperature of the passenger compartment, and temperature information Y of the passenger compartment, are presented as input signals to the controller 32, and an output signal Z of the optimal value is computed and presented to the control valve 28 on the basis of these input signals.

A portion (discharge pressure domain) of the refrigerant gas having discharge pressure Pd discharged from the variable displacement compressor 20 passes through the control valve 28 and flows to an inner chamber of the variable displacement compressor 20. The effect of the control valve 28 will be described in detail later, but the position of the control valve 28 changes in accordance with the level of the signal when the output signal Z is received, and the flow rate of the refrigerant gas that flows to the inner chamber (crank case chamber) of the variable displacement compressor 20 is stipulated by the valve opening.

The variable displacement compressor 20 utilizes a compressor in which the discharge capacity can be varied by using the level of the inner chamber pressure Pc, e.g., a variable oscillating inclined plate-type compressor. Although not shown in the diagram, the chamber pressure of the variable displacement compressor 20 is in communication with the suction side of the compressor via a stop or another controller, and when the throttle position of the control valve 28 is in widely open position and the flow rate of the refrigerant gas increases, the chamber pressure Pc, which is in a state substantially equal to the suctioning pressure Ps, increases, the inclined plate becomes erect, and the discharge rate of the compressor is reduced. Conversely, when the position of the control valve 28 is reduced, an effect occurs in which the chamber pressure Pc is reduced, the inclined plate inclines, and the discharge rate of the compressor is increased. The configuration in which the discharge rate fluctuates due to variation in the chamber pressure Pc in the variable displacement compressor is not limited to one in which the chamber pressure of the compressor is in communication with the suction side of the compressor via a controller, as described above. For example, a conventionally known displacement variable compressor described in Japanese Laid-open Patent Application No. 63-16177 may be adopted.

Next, the specific structure and operation of the control valve 28 will be described with reference to FIGS. 2 and 3. The control valve 28 is composed of a solenoid part 36, a valve portion 38, and a pressure-sensitive part 40. The solenoid part 36 is disposed at one end of a cylindrical valve body 42, and converts the output signal Z from the controller 32 to a direct current value and supplies the current to the coil 44 to thereby generate a magnetic force. The movable iron core 46 is moved against a spring 48 toward the fixed iron core 49 disposed to the left, and a biasing force having a magnitude proportional to the square of the direct current value is imparted to a valve rod 50.

A port 52 that is in communication with the discharge pressure Pd area of the variable displacement compressor 20, and a port 54 that is in communication with the inner chamber (chamber pressure Pc) of the variable displacement compressor 20 are formed on the valve body 42. A valve portion 38 is configured so that the flow rate of the discharge refrigerant gas that flows toward the inner chamber of the compressor 20 can be adjusted based on the valve opening in relation to the valve seat 58 of the valve element 56 formed at the end portion of a valve rod 50 which acts as a moving member.

In contrast, a diaphragm assembly 64 is disposed in the pressure sensitive chamber 62, which is composed of a case 60 and the valve body 42, at the other end portion on the opposite side of the solenoid part 36 of the valve body 42 constituting the pressure-sensitive part 40, and the suctioning pressure Ps of the compressor acts on the pressure sensitive chamber 62. The diaphragm assembly 64 is composed of three diaphragm units 68 held between the center of the casing 60 and the center of the diaphragm holding body 66 and is retractably held in place, and a spacer 70 is disposed between adjacent diaphragm units, as shown in FIG. 3. A spring 72 is mounted in the external peripheral area of the diaphragm holding body 66, a spring force in the leftward direction is imparted to the diaphragm holding body 66, and the diaphragm units 68 are set so that they do not become separated.

A connecting rod 74 is disposed between the diaphragm holding body 66 and a left end 50a of the valve rod 50, connected in direct contact with the two members. Therefore, the diaphragm units 68 expand and contract in accordance with variations in suctioning pressure Ps introduced to the pressure sensitive chamber 62, the biasing force acting on the valve rod 50 varies, and the valve opening becomes variable.

The balance formula $Ps=(F2+F3-F1-F)/A$ of the force that operates on the valve rod 50 when the control valve 28 configured in this manner is open applies when consideration is given to the fact that $Ps=Pc$ at an open valve point between valve opening to valve closing, wherein F1 is the biasing force of the spring 72, F2 is the biasing force of the spring 48, F3 is the initial pressing load of the diaphragm assembly unit 64, F is the solenoid thrust, and A is the effective pressure receiving surface area of the diaphragm unit 68, and wherein, as shown in FIG. 4, the rightward force exerted on the valve rod 50 is composed of the biasing force F2 of the spring 48, the initial pressing load F3 of the diaphragm assembly unit 64, and the force (Pd−Pc) B2 applied to the valve rod 50 based on the pressure difference between the discharge pressure Pd and the chamber pressure Pc (wherein B2 is the effective pressure receiving surface area of the valve seat); and also wherein the leftward force exerted on the valve rod 50 is composed of the biasing force F1 of the spring 72, the force PsA exerted on the diaphragm assembly unit 64 by the suctioning pressure Ps, the force (Pd−Ps) B1 exerted on the connecting rod 74 based on the pressure difference between the discharge pressure Pd and the suctioning pressure Ps (wherein B1 is the effective pressure receiving surface area of the connecting rod), and the solenoid thrust F. Therefore, $F2+F3+(Pd-Pc)B2=F1+PsA+(Pd-Ps)B1+F$, and B1 and B2 are designed to be substantially the same magnitude.

It is apparent from the formula that the suctioning pressure Ps balances at a low value when the solenoid thrust F is increased, and conversely, the suctioning pressure Ps balances at a high value when the solenoid thrust F is reduced. Therefore, the control valve 28 may be widely used as a control valve for variable displacement compressors that are used for compressing refrigerant in air conditioning apparatuses.

In other words, in the adjustment of the cooling ability of the variable displacement compressor, an electric current corresponding to the difference of $Y-X=Z$ is added and supplied by the controller 32 to the coil 44 of the solenoid part 36 when the value of temperature information Y of the passenger compartment exceeds the value of the setting information X generated by a temperature setting device 34, the movable iron core 46 is suctioned toward the fixed iron core 49 side against the biasing force of the spring 48, and the thrust thereof acts as a biasing force in the leftward direction to the valve rod 50. Using this biasing force, the valve rod 50 is configured so that the valve element 56 moves toward the valve seat 58 in the direction in which the valve opening closes, and the flow of the refrigerant gas from the discharge area of the variable displacement compressor 20 toward the inner chamber of the compressor of the variable displacement compressor is reduced, and the chamber pressure Pc is reduced.

When the chamber pressure Pc of the inner chamber of the compressor is reduced, the inclined plate inclines and acts so that the discharge rate of the compressor 20 is increased, the discharge pressure Pd is increased, and the suctioning pressure Ps is reduced. The reduced suctioning pressure Ps is fed back to the pressure-sensitive part 40, acts on the diaphragm assembly unit 64, and imparts a rightward biasing force to the valve rod 50 via the connecting rod 74. When the suctioning pressure Ps is reduced to a prescribed pressure, the valve rod 50 begins to move rightward, the control is started, and the valve opening faces the open direction. The valve rod 50 is held in the valve opening in which the thrust imparted by the solenoid part 36 and the reduced suctioning pressure Ps are counterbalanced. Therefore, the optimal suctioning pressure Ps corresponding to the output signal Z from the controller 32 is obtained, and the temperature of the passenger compartment can be reduced so as to achieve the setting temperature.

Next, the structure of the diaphragm unit 68 will be described with reference to FIG. 5. The diaphragm unit 68 is composed of two diaphragm units 69 joined together. The diaphragm unit 69 has a disc-shaped external appearance, as shown in FIG. 5(a), and a concave portion 69a that protrudes outward is formed in the center, as shown in FIG. 5(b). The diaphragm unit 68 is produced by preparing two identically shaped diaphragm units 69, 69, symmetrically arranging the two units, and joining the flat, ring-shaped external peripheral portions 69b, 69b of the diaphragm units 69, 69 by welding or the like, as shown in FIG. 5(c). In this manner, a void 68a having an elastic force is formed in the center portion by fabricating the diaphragm unit 68.

The interior of the void 68a may be a vacuum or a gas may be sealed therein and provided with a prescribed pressure. The diaphragm acts as a resistance force that attempts to bend when pressure acts on the diaphragm unit 68 from the exterior depending on the level of pressure of the void 68a. Therefore, the thrust produced by the diaphragm unit 68 against the suctioning pressure Ps introduced to the pressure sensitive chamber can be adjusted by suitably selecting the pressure inside the void 68a.

Since the diaphragm unit 68 can be formed merely by joining two single diaphragm units 69, 69, a small circular effective pressure receiving surface area that moves in response to pressure from the exterior can be designed, and in the present example, a diameter portion D (see FIG. 4c) of about 2 mm, which is the effective pressure receiving surface area of the diaphragm unit 68, was fabricated. As a result, a diaphragm unit 68 having an effective pressure receiving surface area of $3.14 \times 0.1 \times 0.1 = 0.03$ cm$^2$ was obtained. This value is one order of magnitude smaller than 0.2 cm$^2$, which is the conventional production limit of the effective pressure receiving surface area of a bellows assembly used in the pressure sensitive part.

It is apparent from the above-described balance formula of the force acting on the valve rod 50; i.e., Ps=(F2+F3−F−F)/A, that a small change in solenoid thrust F can create a balance by virtue of a large change in the suctioning pressure Ps as long as the effective pressure receiving surface area A of the diaphragm unit 68 is reduced, and the pressure sensitive part can still be formed in a compact size even in air conditioners in which $CO_2$ having a high suctioning pressure is used as the refrigerant.

Since the diaphragm unit 68 is enclosed by the diaphragm holding body 66 via a small gap around the external peripheral portion of the unit, and the spring 72 is disposed on the external peripheral portion of the diaphragm holding body 66, the tilt of the diaphragm unit can be controlled by the spring 72 via the diaphragm holding body 66 even if the diaphragm unit 68 receives a bias force so as to tilt during expansion and contraction. Therefore, the thrust generated from the diaphragm assembly unit 64 due to the suctioning pressure Ps can be transferred to the valve rod 50 in a stable state.

An example of the present invention was described above with reference to the drawings; however, the specific configuration is not limited to the example, and modifications and additions within a range that does not depart from the main point of the present invention are included in the present invention. For example, in the example above, three diaphragm units 68 disposed in series via a spacer 70 were used, but the number of the diaphragm units 68 is not limited to three; any number may be used. Moreover, the required stroke distance can be adjusted by the number of the diaphragm units.

Also, the control valve of the example above was described as an example in which an output controller of a variable displacement compressor that compresses refrigerant is used, but application may also be made to a control valve in which the thrust generated from the pressure introduced to the pressure sensitive part and the thrust produced by the solenoid are placed in opposition to the moving member, and the pressure introduced to the pressure sensitive part is used to adjust the valve opening in accordance with the magnitude of the thrust produced by the solenoid.

The invention claimed is:

1. A control valve comprising:
 a pressure sensitive part;
 a solenoid part; and
 a valve portion including a valve element provided on a moving member and a valve seat, wherein
 the valve element, which opens in relation to the valve seat, is adjusted by movement of the moving member, said movement resulting from biasing forces imparted to said moving member;
 a diaphragm holding body and a diaphragm assembly being disposed in a pressure sensitive chamber, said pressure sensitive chamber being partially defined by a casing in said pressure sensitive part; wherein
 said diaphragm holding body is engagingly held against said diaphragm assembly by a spring member disposed at an external periphery of the diaphragm holding body;
 said diaphragm assembly comprising at least one diaphragm unit, said at least one diaphragm unit providing an elastic force and being comprised of two symmetrically arranged diaphragm unit halves bonded only to one another and enclosing a sealed void;
 said at least one diaphragm unit further comprising a radial periphery having an external peripheral portion, said external peripheral portion being surrounded by the diaphragm holding body; wherein the at least one diaphragm unit is disposed between the diaphragm holding body and the casing and includes a center portion in direct contact with a center of the diaphragm holding body; wherein
 a thrust from the at least one diaphragm unit imparts a first biasing force to said moving member via said diaphragm holding body, said thrust being generated in accordance with a pressure in the pressure sensitive chamber which acts on an effective pressure receiving surface area of said at least one diaphragm unit; and wherein a solenoid thrust imparts a second biasing force to said moving member in accordance with an input signal from said solenoid part, said second biasing force operating in coordination with said first biasing force.

2. A variable displacement compressor designed to vary its discharge capacity using the control valve according to claim 1; wherein
   said variable displacement compressor varies the discharge capacity using a pressure difference between an interior pressure of the compressor and a suctioning pressure;
   the suctioning pressure of the compressor is introduced to the pressure sensitive chamber of said control valve;
   a discharge pressure area of the compressor and an inner chamber of the compressor are in communication via a communication channel; and
   a flow rate in the communication channel is adjusted on the basis of an opening of the valve element by movement of said moving member.

\* \* \* \* \*